May 23, 1944.  H. G. TATOSIAN  2,349,582
METHOD OF MAKING MELBA TOAST
Filed Jan. 17, 1942
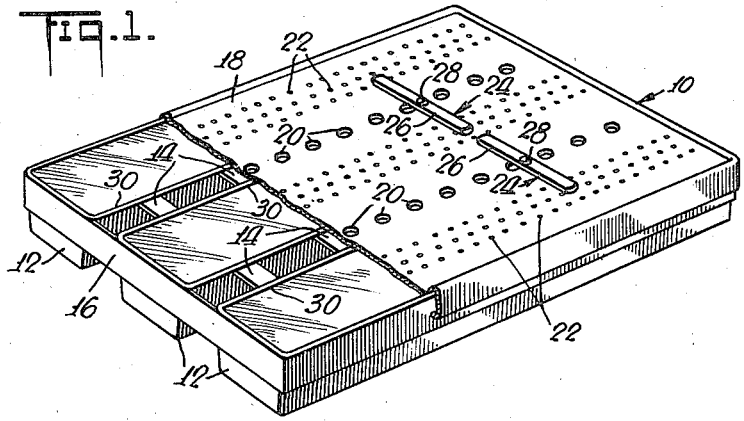
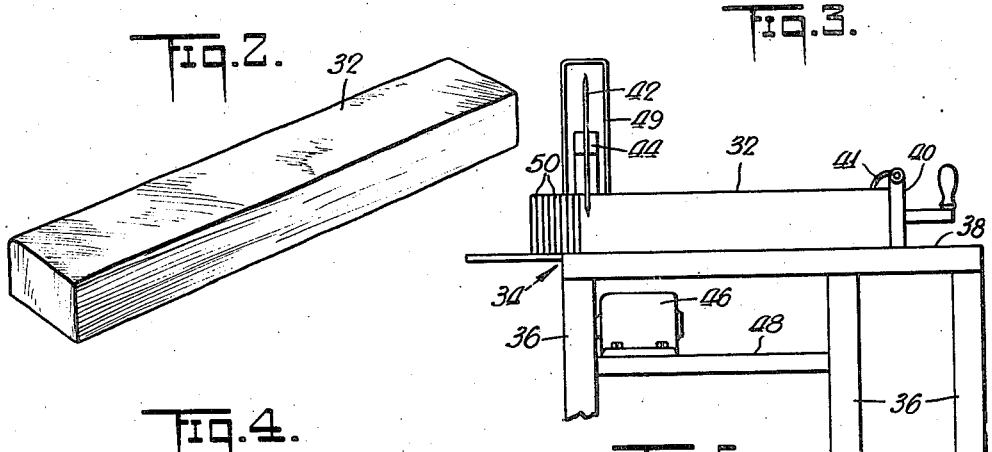
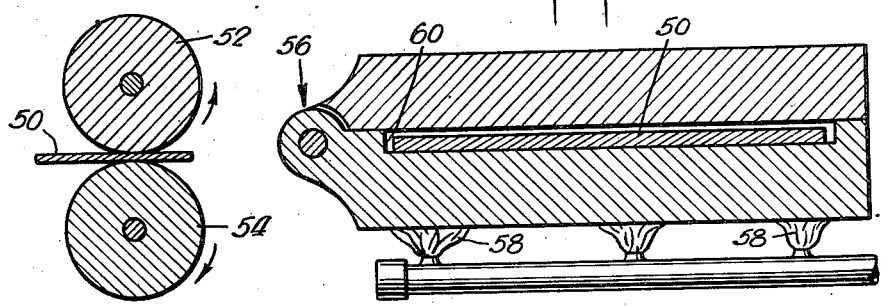
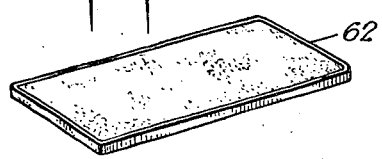
INVENTOR
*Harry G. Tatosian*
BY *Richard J. Newling*
ATTORNEY Patented May 23, 1944

2,349,582

UNITED STATES PATENT OFFICE 2,349,582

METHOD OF MAKING MELBA TOAST

Harry G. Tatosian, New York, N. Y., assignor to King Kone Corporation, New York, N. Y., a corporation of New York Application January 17, 1942, Serial No. 427,163

1 Claim. (Cl. 99—90)

The present invention relates generally to toasted bread products, and it is directed specifically to a method of making toast of the type conventionally known as melba toast.

At the present time it is the customary practice to make melba toast from conventionally sliced bread which is sold by large baking establishments to retail stores for sale to the home consumer. Of this kind of bread there is a substantial percentage sold and delivered to the storekeepers which remains unsold from day to day. It is the regular practice of such bakers to take back from day to day their unsold day-old bread, which obviously must be disposed of through other channels of trade as it cannot be resold again as fresh bread. This returned day-old bread results in a very substantial loss to such bakers. It is now a practice among such bakers to take their returned day-old bread, cut the slices in half, trim off the crust portions, and make melba toast out of it. Trimming off the crust in this process has many distinct disadvantages. It is wasteful. The crust is the most healthful part of a piece of bread, and it is the part most highly desired by many people. In the manufacture of such melba toast, it has also been deemed necessary and essential to toast such prepared bread slices under pressure to reduce its thickness and close up its porosity so as to make it tasty and saleable to the trade.

With the method hereinafter to be described, however, it has been found that a better and more tasty product can be produced, obviating the inherent disadvantages of the above practice, by making a specially prepared bread loaf of a size suitable for producing a melba toast slice of the size desired, which bread loaf is provided with an encircling crust on all exterior surfaces that gives the finished toasted product an eye and taste appeal not found in the conventional types of melba toast made according to the practice hereinbefore described.

An object of the present invention is to provide a new and novel method of preparing melba toast products which will have an encircling crust along their entire peripheral edge.

A further object of the invention is the provision of a new and novel method of preparing a melba toast product which has a consistency, degree of hardness or density at its edge portions different from its center portion, thereby simulating the features of a toasted conventional slice of bread, which is desirable since most toast lovers prefer the hard toasted crust portions of toasted bread to the soft center portions.

Various other objects and advantages of the invention, which result in simplicity, economy and efficiency, will be apparent from the following detailed description, wherein a preferred form of practicing the invention is described, reference being had to the accompanying drawing, forming a part hereof, wherein like numerals indicate like parts, in which:

Fig. 1 is a perspective view of a multiple bread pan, with parts broken away for the sake of clearness, such as is used in baking my especially prepared bread loaf;

Fig. 2 is a perspective view of a loaf of bread upon its removal from one of the bread pans shown in Fig. 1;

Fig. 3 is a diagrammatic view of a conventional bread cutter, which is used in slicing the bread shown in Fig. 2;

Fig. 4 is a diagrammatic sectional view of a conventional compressing machine, showing a slice of bread being passed therethrough;

Fig. 5 is a sectional view of a book type mold, showing a slice of bread therein, in which the same is toasted; and Fig. 6 is a perspective view of the slice of bread after it has been toasted in the mold shown in Fig. 5.

Referring now to Fig. 1 of the drawing, there is shown a multiple bread pan 10 having a plurality of individual bread pans 12 secured together in spaced transverse relationship by a series of spacer bars 14. The assembled group of pans is then fastened peripherally by an encircling band member 16. A cover member 18 is provided for the assembled group of bread pans 12, having a plurality of spaced relatively large apertures 20 arranged in longitudinal rows extending over the space between adjacent pans 12. These large apertures 20 serve as vents for permitting the circulation of heat between the individual pans 12 while the bread is being baked therein in an oven (not shown). The relatively small apertures 22 in the cover member 18 are positioned so as to be directly over the individual pans 12, and serve to permit the escape of gas given off by the bread dough during baking. Pairs of spaced longitudinal locking members 24 are mounted on the cover member adjacent each end and serve to fasten the cover member 18 removably to the multiple bread pan 10. Each locking member 24 has an upper cross bar 26 fixedly mounted on a pin 28. A similar cross bar is mounted fixedly on the lower end of the pin 28, which is pivotally mounted through the cover member 18. The lower cross bar is movable with the upper cross bar 26. When the cross bars extend transversely of the cover member 18 as shown in Fig. 1, the lower cross bar engages the underside of the beaded reinforcing edge 30 on the individual bread pans 12 and lock the same tightly over the multiple bread pan 10. When the cross bars are moved so as to extend longitudinally of the cover member 18, they are free of engagement with the beaded edge 30 of adjacent bread pans 12, and the cover member 18 may be lifted therefrom. It is to be understood that when the dough is prepared properly, and the desired amount is placed in each pan 12, the cover 18 is to be fastened thereover. Then the pan 10 and contents are now ready to be placed in a suitable oven (not shown) and baked in the usual manner. The rising dough during the baking operation will engage the underside of the cover 18, and the finished loaf of bread, when removed from the pans 12, will have a similar crust formation of even thickness all over its exterior surfaces.

The baked loaf of bread 32, which is best shown in Fig. 2, is substantially of the shape and size desired in the finished toasted product, but generally is a trifle larger in cross-section than the finished product in order to compensate for the normal amount of shrinkage during the toasting operation. It is now ready to be cut into relatively thin slices of the desired thickness.

There is shown diagrammatically in Fig. 3, a conventional bread slicing machine 34, consisting of a plurality of uprights 36, a table top 38, having a carriage 40 provided with a fastening member 41 for engaging the baked load of bread 32 and for automatically feeding it to a revolving slicing knife 42, which is eccentrically mounted on a shaft 44 connected suitably to a driving motor 46 mounted on supports 48 underneath the table top 38. A protective hood 49 encloses the knife 42. The slicing machine 34 is of conventional construction forming no part of this invention, and, therefore, it is not believed to require further detailed description. The loaf of bread 32 is cut on this machine into a plurality of very thin individual slices 50 of the desired thickness for making the desired size of melba toast.

These thin slices 50 are now ready to be compressed momentarily to close the pores and give them a surface much finer in texture than the surface texture of ordinary bread, or a surface texture that is much finer than that possible in baking. One form of apparatus for compressing the slices of bread is shown diagrammatically in Fig. 4, and consists of a pair of oppositely revolving rollers 52 and 54, which have an adjustable clearance between them so as to permit compression of the bread to the degree desired. Obviously, the clearance or space between the rollers 52 and 54 must be less than the thickness of the relatively thin bread slices 50 to be passed therebetween. While only this one form of compressing the bread slices 50 is shown in the drawing, it is to be understood that any other method which will accomplish the desired result may be used.

After the bread slices 50 have thus been compressed and the pressure removed, they are ready to be toasted. Toasting may be accomplished in many different ways. One form is shown in Fig. 5, wherein a conventional hinged book mold 56 is shown, containing a slice of bread 50, being subjected to heat by means of a series of gas burners 58. In actual commercial operation, a baking machine similar to that shown in my United States Letters Patent No. 1,540,041, is employed, using book molds of the type herein shown instead of those shown in the patent, which are embellished with a waffle design for producing a cone having an embossed surface. It will be noted that the hinged mold 56 is provided with a pocket 60 of greater dimensions than the slice of bread to be toasted. Of course, two or more slices of bread may be toasted at the same time in one mold if its pocket 60 is of sufficient size. The pocket 60 has a depth a trifle larger than the thickness of the compressed slice of bread to be toasted therein so that the toasting operation is performed while the bread slice 50 is entirely free of pressure. This is important because the absence of pressure during the toasting period permits the bread surface to remain free, and its infinitely small crumby surface to curl during the toasting operation, preventing a glazed unappetizing surface being formed thereon as in the case of bread toasted while under pressure. The crust portion of the bread slices 50, which completely encircles the slice, prevents distortion of the same during the compressing operation, and also serves to control the shrinkage of the bread during the toasting operation and prevents distortion into weird shapes that would render the same unfit for sale.

Toasted bread slices 62 made according to this method have a superior and more appetizing appearance over bread slices toasted under pressure. Furthermore, toasted bread slices made according to this invention have a slightly roughened surface, which will facilitate spreading with butter, jam, jellies, etc. This roughened surface imparts a more natural and tasty feeling to the tongue of the consumer than melba toast slices made under pressure under present day practices.

Although I have only described in detail only one form which the invention may assume, it will be apparent to those skilled in the art that various other modifications may be made therein without departing from the spirit of the invention or from the scope of the appended claim.

What I claim is:

A method of making melba toast including the steps of flattening an untoasted slice of bread by momentarily subjecting the slice to pressure to compact the same, subjecting first one side of the compacted slice directly to heat by placing it in direct contact with the adjacent surface of the mold until the same is toasted substantially while the opposite side is being subjected indirectly to heat from its adjacent surface of the mold which is not directly in contact with the slice, and then turning over the slice of partially toasted bread so that the opposite side may be subjected directly to heat while in actual contact with the surface of the mold while the first side is being subjected to heat indirectly by being out of contact with its adjacent mold surface until both sides of the slice of bread have been completely browned and toasted without exerting any pressure thereon during the toasting operation.

HARRY G. TATOSIAN.